United States Patent

Karle et al.

[15] 3,685,344

[45] Aug. 22, 1972

[54] DIFFERENTIAL THERMAL ANALYSIS CELL ASSEMBLY

[72] Inventors: Franklin J. Karle, Midland, Mich.; Horst G. Langer, Wayland, Mass.

[73] Assignee: The Dow Chemical Company, Midland, Mich.

[22] Filed: Oct. 8, 1969

[21] Appl. No.: 868,968

Related U.S. Application Data

[63] Continuation-in-part of Ser. No. 742,869, July 5, 1968.

[52] U.S. Cl. ................. 73/15 B, 136/224, 136/233
[51] Int. Cl. ............................................ G01n 25/00
[58] Field of Search ............... 136/233, 224; 73/15 B

[56] References Cited

UNITED STATES PATENTS

3,417,604  12/1968  Bean et al. ................. 73/15 B
3,283,560  11/1968  Harden et al. ............. 73/15 B

OTHER PUBLICATIONS

Journal of the Chemical Society, Jan 1962, pp. 464–470

*Primary Examiner*—Carl D. Quarforth
*Assistant Examiner*—Harvey E. Behrend
*Attorney*—Griswold and Burdick and Earl D. Ayers

[57] ABSTRACT

This invention relates to a thermal analysis cell which is capable of supplying meaningful data in a high vacuum which is particularly useful for operations within a mass spectrometer or similar instrument which allows the heating of samples within the confinement of the mass spectrometer vacuum or within the ion source. The cell comprises a silver block to guarantee uniform heat throughout the cell. It is insulated against the push-through shaft by a section of boron nitride which is an excellent thermal insulator. The silver cell is equipped with temperature sensors to develop signals for temperature control purposes and for comparing the temperatures of the sample and reference cells. A sample well in the end of the silver block is designed to contain the sample. The sample itself is loaded into a glass or metal capillary and pushed into the well and unto a needle tipped temperature sensing assembly.

7 Claims, 4 Drawing Figures

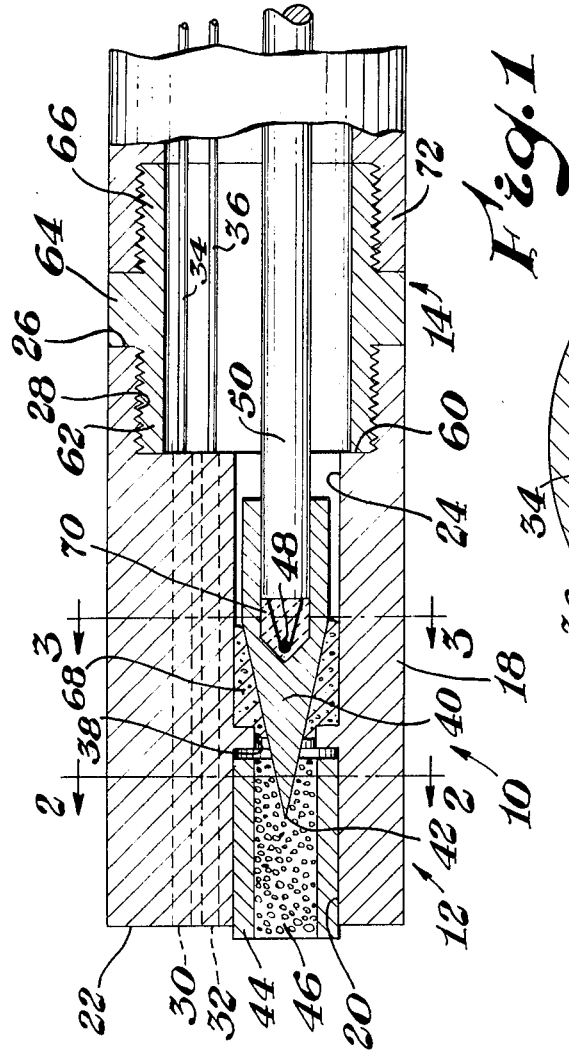
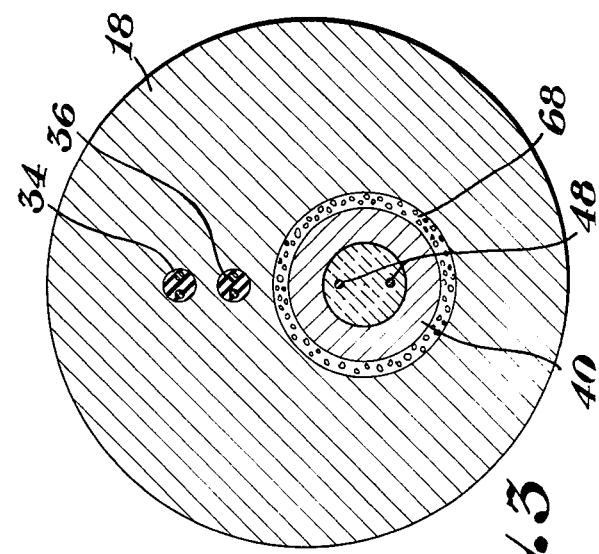
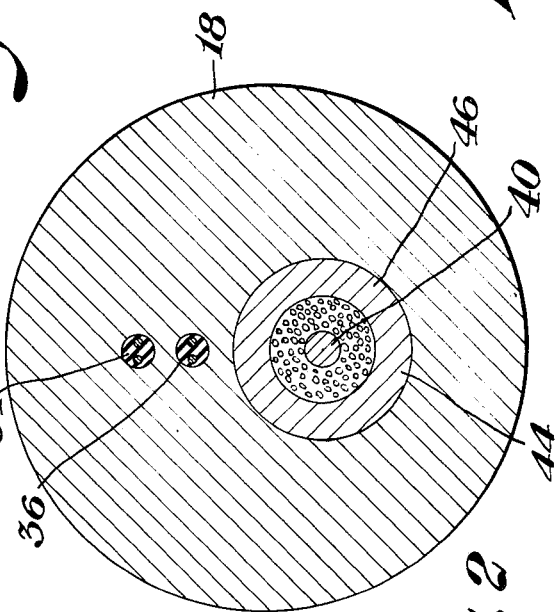

DIFFERENTIAL THERMAL ANALYSIS CELL ASSEMBLY

This application is a continuation-in-part of F. J. Karle et al's copending application Ser. No. 742,869, filed July 5, 1968 for "Differential Thermal Analysis Cell Assembly."

BACKGROUND OF THE INVENTION

This invention relates to differential thermal analysis cells and particularly to differential thermal analysis cells for use in a high vacuum such as exists inside a mass spectrometer, for example.

A thermal analysis cell which is capable of supplying meaningful data in a high vacuum is particularly useful for operations within a mass spectrometer or similar instrument.

However, even though mass spectrometers are sometimes equipped with devices which allow the heating of samples within the confinement of the mass spectrometer vacuum or within the ion source, and such devices sometimes also allow the measurement of sample temperatures during the heating process, these devices do not allow the operation known as thermal analysis.

In thermal analysis, it is essential that the sample be heated at a linear predetermined rate of heating, that the sample temperature is known and indicated at all times, and for differential thermal analysis operations the sample temperature is continuously compared with that of an inert material in the same cell.

In general, this requires that the thermocouples or other suitable temperature sensors located in the thermal analysis cell should be precisely at the same temperature at all times unless a chemical reaction occurs in the sample. Thus, it is also of extreme importance that equal heat transfer is guaranteed from the heat source to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems.

A principal object of this invention is to provide an improved differential thermal analysis cell assembly.

Another object of this invention is to provide an improved differential thermal analysis cell assembly which is adapted to be used in a high vacuum.

In accordance with this invention, there is provided a cell assembly for insertion in a high vacuum device. The cell itself consists of a silver block to guarantee uniform heat throughout the cell. It is insulated against the push-through shaft by which it is inserted in the mass spectrometer or other high vacuum device by a section of boron nitride which is an excellent thermal insulator. The silver cell is usually equipped with two equal thermocouple wells containing the control thermocouple and the reference thermocouple. A third and larger well is designed to contain the sample. The sample itself is loaded into a glass or metal capillary and pushed into the well and unto a needle tipped thermocouple assembly. This thermocouple assembly consists of a chromelalumel or other thermocouple contained in a ceramic insulator and surrounded by a silver tip which protrudes into the sample but without making electrical contact with either the block or any other thermocouple. This is achieved by placing a small amount of ceramic cement around the silver tip upon insertion of this thermocouple assembly into the silver block. The sample itself provides sufficient electrical insulation to allow even the use of a metal capillary as a sample container. Small sample sizes assure fast and uniform heating of the sample while the silver tipped sample thermocouple guarantees fast response to thermal effects in the sample itself.

The only efficient way of heat transfer in a vacuum is by radiation, thus the DTA cell itself is surrounded during operation by a radiative furnace.

The invention, as well as additional objects and advantages thereof, will best be understood when the following detailed description is read in connection with the accompanying drawing, in which:

FIG. 1 is a side elevational view, partly broken away and in section, of a differential thermal analysis cell assembly in accordance with this invention;

FIG. 2 is a sectional view taken along the line 2—2 of FIG. 1;

FIG. 3 is a sectional view taken along the line 3—3 of FIG. 1, and

Figure 4:
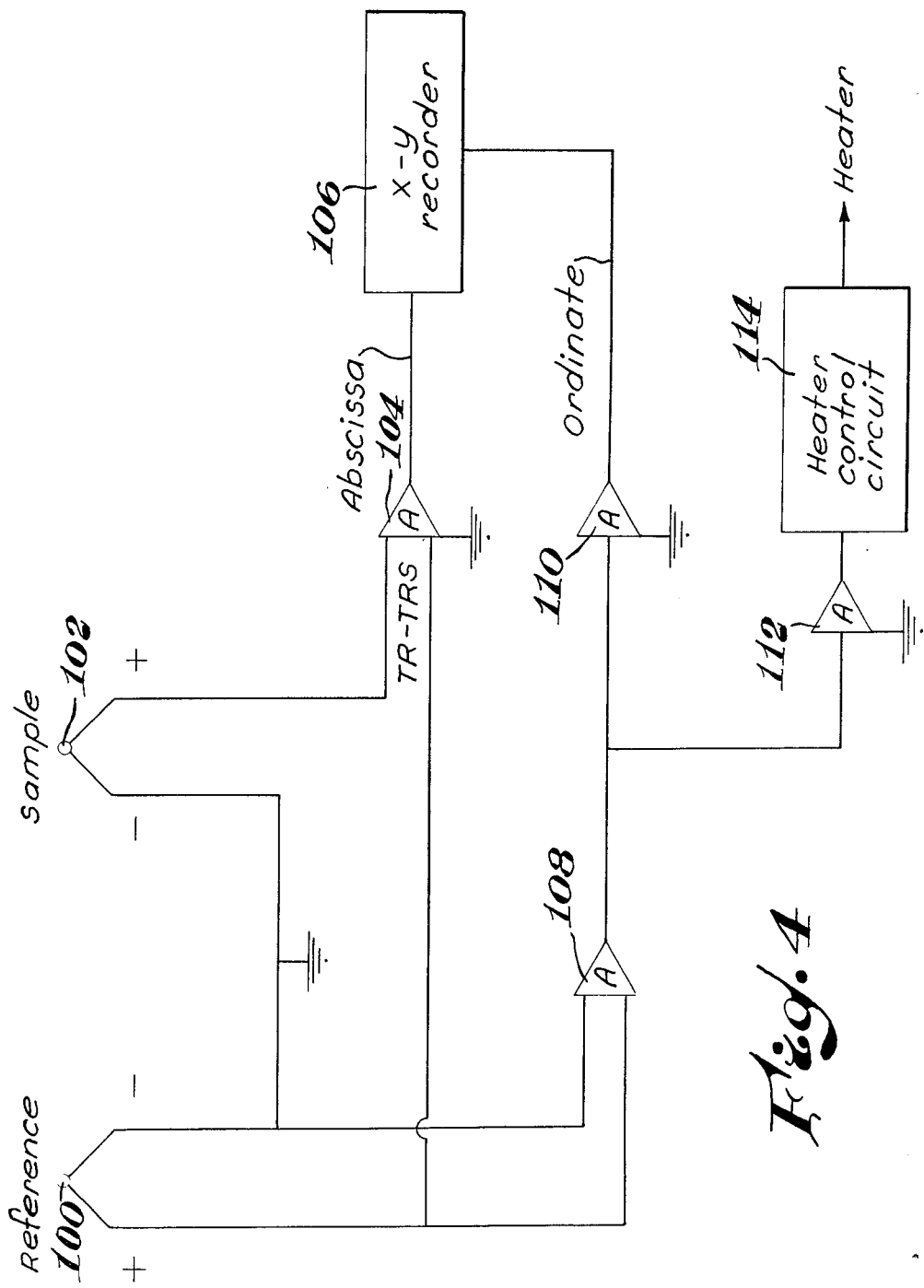
FIG. 4 is a block diagrammatical view of a circuit used in developing sample temperature, reference temperature and cell heater control temperature signals.

Referring to the drawing, there is shown a differential thermal analysis cell assembly, indicated generally by the numeral 10.

The assembly 10 comprises a cell, indicated generally by the numeral 12, a thermally insulating coupler 14 and a probe rod part 16.

The cell 12 comprises an elongated cylindrical silver block 18 which contains an axial off-center bore 20 which extends inwardly from the end 22 of the block 18. A bore 24, axially aligned with the bore 20 extends towards the bore 20 from the other end 26 of the block 12. The bores 20, 24 are separated by the shoulder 38 which is formed by drilling a small bore between the bores 20, 24.

The end 26 has a counterbore 60 whose inner wall surface 28 is threaded.

A pair of axial bores 30, 32, equal in size, extend through the block 18 from the end 20 to the end 60. Cables 34, 36 which contain thermocouples at their ends near the end 20 are disposed in the bores 30, 32, respectively.

A larger diameter cable 50 extends into the bore 24 and terminates in a thermocouple 48, usually a chromel-alumel thermocouple embedded in ceramic 70. A silver tip 40 having a tubular body which fits over the end part of the cable 50 has a pointed tip 42 which extends through the space between the shoulder 38 and into the bore 20.

The silver tip 40 is spaced from the silver block 18 by electrically insulating cement 68 which extends usually from the shoulder 38 to near the back of the "point" part of the tip 40.

The electrical and thermally insulating coupling element 14 is conveniently made of boron nitride and is a tubular element having a smoother inner wall 60, a center part 64 of the same outer diameter as the outer diameter of the block 18, and threaded end parts 62, 66 of reduced diameter which (in the case of end part 62) engage the threaded part 28 of the block 18.

The probe tube 16 has a threaded end 72 which is threadedly coupled to the thread end part 66. The cables 34, 36, and 50 extend through the element 14 and probe tube 16 to the connector 52 which is coupled to the end of the probe tube 16 which is most remote from the silver block 18. The individual wires of the cables are connected to individual terminal pins 54 of the connector 52.

An annular shaped handle and stop member 56 fits over the probe tube 16 and is held in pre-determined position by the screw 58.

A capillary type tube 44 having particulated sample material 46 disposed therein is inserted by friction fit into the bore 20. The pointed tip 42 of the tip part 40 extends through the open part of the tube 44 and into the sample material.

In operation, the tube 44, as mentioned above, is packed with sample material and inserted in the bore 20 with the point 42 of the tip 40 extending into the sample and making physical contact with the sample 46. The tip 40 is electrically insulated from the block 18 by the cement 68 (usually a ceramic cement).

The element 14, made of boron nitride, as previously mentioned, thermally isolates the cell tip part 12 from the probe tube 16 (usually made of metal).

The entire assembly 10 is adapted to be inserted into a high vacuum device such as a mass spectrometer, for example through suitable sealable entry means (not shown). A cell probe entry and cell heating means which is especially useful in connection with this and other cell assemblies is disclosed and claimed in Franklin J. Karle's copending patent application Ser. No. 742,868, entitled "Furnace Assembly for Thermal Analysis Use," filed July 5, 1968.

The assembly 12 is about 8 inches in length in one embodiment which has been tested. The sample holder tube 44 is about 2 mm. in diameter, and may be made of glass or metal such as stainless steel or other metal which is non-reactive with the sample.

While the invention has been described as having three separate temperature sensors (usually thermocouples) for developing signals representing sample and reference temperatures and a furnace control signal, these signals may be derived from two temperature sensors.

Referring to FIG. 4, it may be seen that the outputs of the reference temperature sensor 100 and sample temperature sensor 102 are coupled to the input of a very high input impedance operational amplifier 104 in a subtractive relationship. The output of the amplifier 104 drives the abscissa of an X-Y type recorder 106.

The reference signal is also coupled to a very high input impedence operational amplifier 108 whose output is coupled to the input of very high input impedance amplifiers 110, 112 respectively.

The output of the amplifier 112 is coupled to a heater control circuit which is in turn coupled to the furnace (not shown) used to heat the cell assembly.

The output of amplifier 110 is coupled to the ordinate drive of the X–Y recorder 106.

The very high input impedance of 104, 108, prevents signal interaction which would hinder the use of the reference sensor signal also being used as the furnace control signal (or vice versa). It is assumed that the placement of the second (usually the reference) temperature sensor in the assembly is such that the output signal is suitable as the furnace control signal.

Thus, while it may be convenient to use three temperature sensors in many applications, the alternative shown in simplified form in FIG. 4 may be used.

It has been found that the device satisfies the desired conditions that three thermocouples located in the thermal analysis cell should be precisely at the same temperature at all times unless a chemical reaction occurs in the sample; that no temperature gradient exists in the cell itself, and that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems. This is easily accomplished with cell assemblies in accordance with this invention.

What is claimed is:

1. A differential thermal analysis cell assembly for use under high vacuum conditions, comprising a cell section, a thermal isolation section and a hollow probe section, said sections being joined together in the order listed in end to end relationship and having, when so joined, a generally cylindrical configuration with a smooth substantially constant diameter outer surface, said cell section comprising a generally cylindrically shaped block of highly thermally conductive metal having a sample receiving bore extending inwardly from one end and a bore axially aligned with said cell receiving bore extending toward said cell receiving bore from the other end of said block of metal, said sample receiving bore being adapted to receive in friction fit relationship a capillary element filled with sample material to be analyzed, said axially aligned bores being joined by a third axially aligned bore of smaller diameter than said axially aligned bores to provide an inwardly extending shoulder between said axially aligned bores, a sample contacting temperature sensor assembly comprising a highly thermally conductive metal member having a tubular part joined to a sharply pointed part, said member being inserted in said aligned bores with the sharp end of said sharply pointed part extending into said sample cell receiving bore and said tubular part being in said bore extending towards the sample receiving bore from the other end of said block, said member being fixedly secured in position in electrical and thermally insulating position with respect to said block, a temperature sensing element, said sensing element being coupled to electrical leads, said sensing element being sealed closely adjacent to said pointed part, said silver block also containing means for developing a reference signal and a temperature control signal, said means being coupled to electrical leads, said thermal isolation section being a boron nitride element rigidly coupled at one end to said cell section and at its other end to said probe section, said probe section having electrical coupling means at its end which is remote from said thermal isolation section, said coupling means being electrically connected to said electrical leads.

2. A cell assembly in accordance with claim 1, wherein said axially aligned bores are off center with respect to said block when viewed in transverse cross section.

3. A cell assembly in accordance with claim 1, said means for developing a reference signal and a temperature control signal comprises a pair of temperature sensing elements disposed in bores in said block of highly thermally conductive metal.

4. A cell assembly in accordance with claim 1, wherein said highly thermally conductive metal member is spaced from said block.

5. A cell assembly in accordance with claim 1, wherein said probe section has adjustable stop movement means coupled thereto.

6. A cell assembly in accordance with claim 1, wherein said block is made of silver.

7. A cell assembly in accordance with claim 2, wherein said highly thermally conductive metal member is made of silver.

* * * * *